United States Patent
Shinohara

(10) Patent No.: US 7,218,540 B2
(45) Date of Patent: May 15, 2007

(54) POWER SEMICONDUCTOR DEVICE

(75) Inventor: Masuo Shinohara, Hyogo (JP)

(73) Assignees: Mitsubishi Denki Kabushiki Kaisha, Tokyo (JP); Renesas Device Design Corp., Hyogo (JP)

( * ) Notice: Subject to any disclaimer, the term of this patent is extended or adjusted under 35 U.S.C. 154(b) by 334 days.

(21) Appl. No.: 10/895,835

(22) Filed: Jul. 22, 2004

(65) Prior Publication Data

US 2005/0169026 A1 Aug. 4, 2005

(30) Foreign Application Priority Data

Jan. 29, 2004 (JP) .............................. 2004-021276

(51) Int. Cl.
*H02M 7/5387* (2006.01)
*H02M 3/24* (2006.01)
*H02P 5/34* (2006.01)
*H02H 7/10* (2006.01)

(52) U.S. Cl. ..................... 363/132; 363/98; 318/801

(58) Field of Classification Search ................. 363/95, 363/97, 98, 131, 132; 318/798–802, 805, 318/806, 812, 814
See application file for complete search history.

(56) References Cited

U.S. PATENT DOCUMENTS

| | | | | |
|---|---|---|---|---|
| 5,486,743 A | * | 1/1996 | Nagai | .......................... 318/439 |
| 5,495,908 A | * | 3/1996 | Obara et al. | ................ 180/65.8 |
| 5,896,283 A | * | 4/1999 | Usami | .......................... 363/98 |
| 5,903,116 A | * | 5/1999 | Geis et al. | .................... 318/140 |
| 6,384,567 B1 | * | 5/2002 | Maeda | ........................ 318/801 |
| 6,396,225 B1 | * | 5/2002 | Wakui et al. | ................ 318/254 |

FOREIGN PATENT DOCUMENTS

| | | |
|---|---|---|
| JP | 5-241662 | 9/1993 |
| JP | 8-66049 | 3/1996 |
| JP | 2002-34263 | 1/2002 |
| JP | 2003-9539 | 1/2003 |

* cited by examiner

*Primary Examiner*—Matthew V. Nguyen
(74) *Attorney, Agent, or Firm*—McDermott Will & Emery LLP

(57) ABSTRACT

Inverter circuits are connected to a P electrode and an N electrode, and control the U, V and W phases, respectively, of a three-phase motor. The inverter circuits are connected to the three-phase motor through shunt resistors, respectively. The shunt resistors are connected to HVICs, respectively. The HVICs are connected to a counter circuit. The counter circuit is connected to a CPU. The CPU is connected to a clock transmitter and a gate drive circuit.

6 Claims, 4 Drawing Sheets

POWER SEMICONDUCTOR DEVICE

BACKGROUND OF THE INVENTION

1. Field of the Invention

The present invention relates to a power semiconductor device and, more particularly, to a technique for detecting the load current of a motor for an automotive vehicle, and the like.

2. Description of the Background Art

Background art current detection of power semiconductor devices for driving motors for automotive vehicles and the like has generally employed a Hall element or a combination of a shunt resistor and a linear isolation amplifier. Recently, a power semiconductor device employing a combination of a shunt resistor and an HVIC (high voltage IC) has made its appearance as a less expensive power semiconductor device than those described above. The HVIC is a control element which performs inverse level shift from a voltage on the high side of the shunt resistor to a voltage on the low side thereof, and has a PWM (pulse width modulation) function for converting the value of a voltage developed across the shunt resistor into a pulse width. A pulse is outputted from the HVIC through an I/O bus to a CPU which in turn measures the pulse width thereof to convert the pulse width into numerical data.

Examples of the power semiconductor devices which measure the pulse width of the pulse subjected to the PWM are disclosed in, for example, Japanese Patent Application Laid-Open No. 8-66049 (1996) and Japanese Patent Application Laid-Open No. 2002-34263.

For the background art current detection of the power semiconductor devices, an interrupt function or an input capture function of the CPU is used to measure the pulse width.

However, the use of the interrupt function is disadvantageous in that the increased load on the CPU impairs a real time property or decreases the accuracy of measurement.

The use of the input capture function, which is normally used to read an encoder, is disadvantageous in that there are not enough channels to read pulses from the HVIC.

A reference clock for a typical CPU is multiplied in the CPU but has a frequency too low for use in reading the above-mentioned pulses. This presents a problem such that the accuracy of measurement might decrease. For instance, currently commercially available HVICs with the inverse level shift function which have the highest carrier frequency include IR2172 from International Rectifier (40 kHz). If the reference frequency of the reference clock is 10 MHz and a full scale current value is 500 A, increased error of 500 A×(40 kHz/10 MHz)=2A results in the low accuracy of measurement.

A current feedback period is normally in synchronism with inverter control PWM carrier interrupt, and is required to have a response about one-tenth of an inverter control PWM carrier period. Thus, when the inverter control PWM carrier period is 100 to 200 µs, the current feedback period must have a response of 10 to 20 µs. On the other hand, when the carrier frequency of the HVIC is 40 kHz as mentioned above, the carrier period of the HVIC is 25 µs. Then, if the CPU and the HVIC are asynchronous to each other, a delay of up to 25 µs×2=50 µs occurs between the reading of a pulse and the measurement of the pulse width. This presents a problem that the response is slow in some cases.

Since the above-mentioned delay of 50 µs is varied depending on how much the CPU and the HVIC are out of sync with each other, the variation ranges from 0 to 50 µs. It is, therefore, more difficult for the power semiconductor device employing the shunt resistor and the HVIC for current detection to make corrections and, accordingly, to increase gain than the power semiconductor device employing the Hall element which exhibits the smaller variations for current detection. (As an example, if an output frequency is 500 Hz, the period is 2 ms, and therefore the variation of 50 µs corresponds to 2.5% fluctuation.)

SUMMARY OF THE INVENTION

It is an object of the present invention to provide a power semiconductor device capable of increasing the accuracy of measurement.

According to the present invention, a power semiconductor device includes a shunt resistor, a converting element, and a CPU. The shunt resistor is inserted in an output current path of an inverter circuit. The converting element converts the value of a voltage developed across the shunt resistor into numerical data. The CPU receives the numerical data outputted from the converting element, and controls the inverter circuit based on the numerical data.

The power semiconductor device according to the present invention eliminates the need to use an interrupt function of the CPU. This avoids the increase in load on the CPU, thereby producing the effects of preventing a real time property from being impaired and preventing the accuracy of measurement from decreasing. Additionally, the power semiconductor device according to the present invention eliminates the need to use an input capture function of the CPU to produce the effect of placing no strain on channels for the input capture.

These and other objects, features, aspects and advantages of the present invention will become more apparent from the following detailed description of the present invention when taken in conjunction with the accompanying drawings.

DESCRIPTION OF THE PREFERRED EMBODIMENTS

[First Preferred Embodiment]

Figure 1:
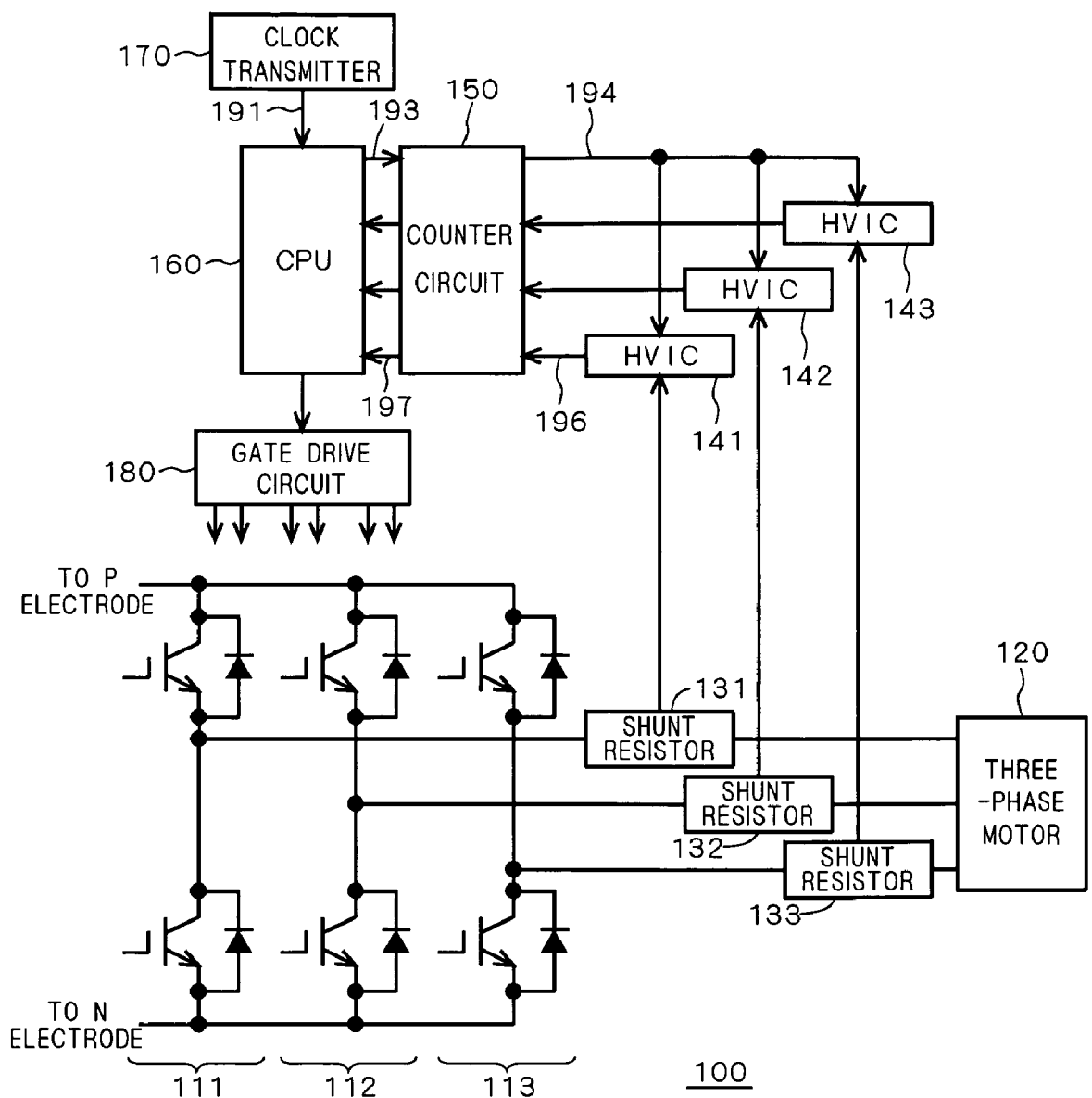
FIG. 1 is a diagram showing the construction of a power semiconductor device according to a first preferred embodiment of the present invention.

FIG. 1 shows the construction of a power semiconductor device 100 according to a first preferred embodiment of the present invention.

Referring to FIG. 1, inverter circuits 111 to 113 are connected to a P electrode and an N electrode, and supply current to the U, V and W phases, respectively, of a three-phase motor 120 to control the same. The inverter circuits 111 to 113 are connected to the three-phase motor 120 through shunt resistors 131 to 133, respectively. The shunt resistors 131 to 133 are connected to HVICs 141 to 143, respectively. The HVICs 141 to 143 are connected to a counter circuit 150. The counter circuit 150 is connected to a CPU 160. The CPU 160 is connected to a clock transmitter 170 and a gate drive circuit 180.

With reference to FIG. 1, voltages are developed across the respective shunt resistors 131 to 133, based on currents flowing to the U, V and W phases of the three-phase motor 120.

The operation of the power semiconductor device 100 shown in FIG. 1 will be described with reference to the timing charts of FIGS. 2A to 2F.

Figure 2:
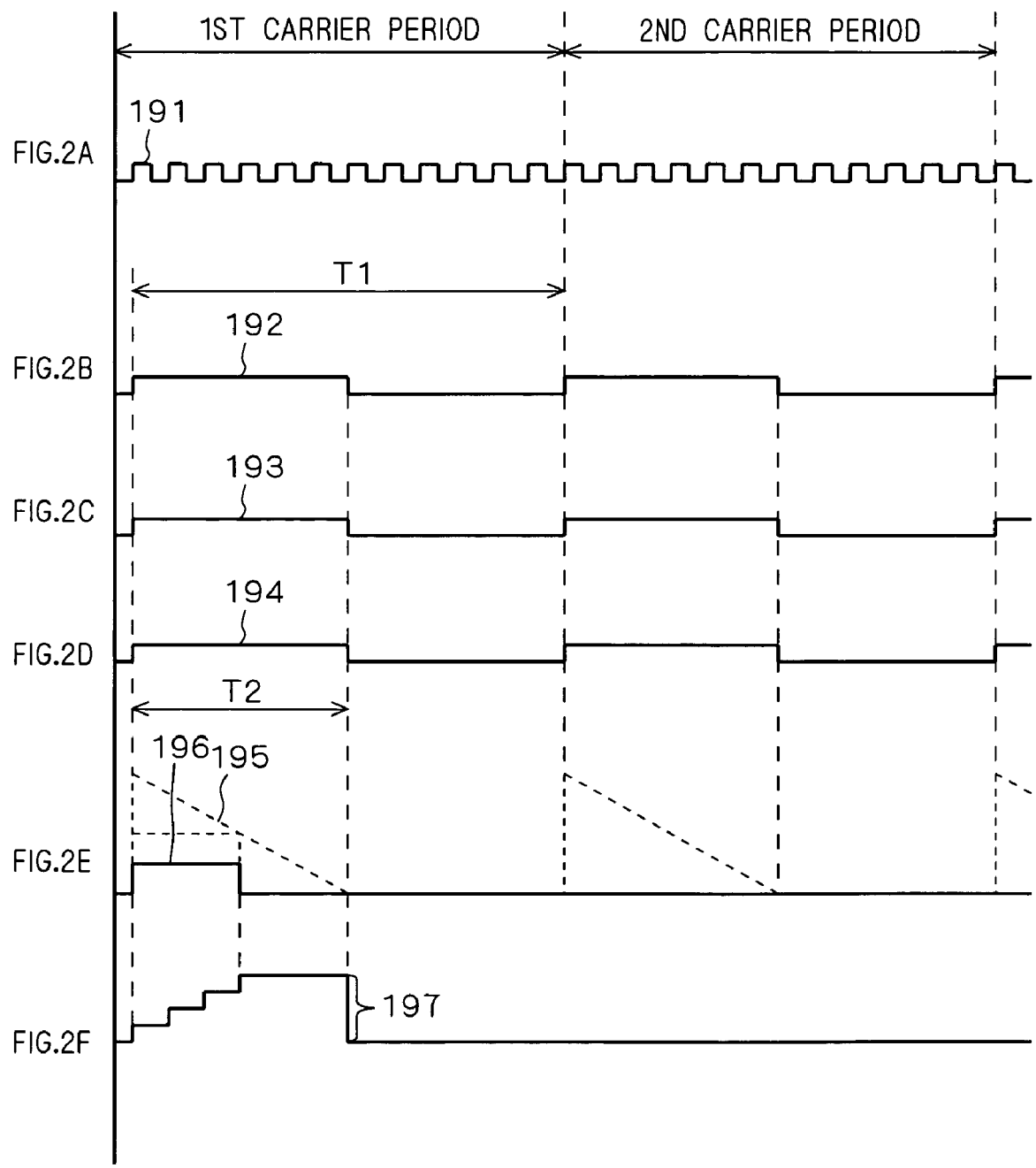
FIGS. 2A to 2F are timing charts showing the operation of the power semiconductor device according to the first preferred embodiment.
Figure 3:
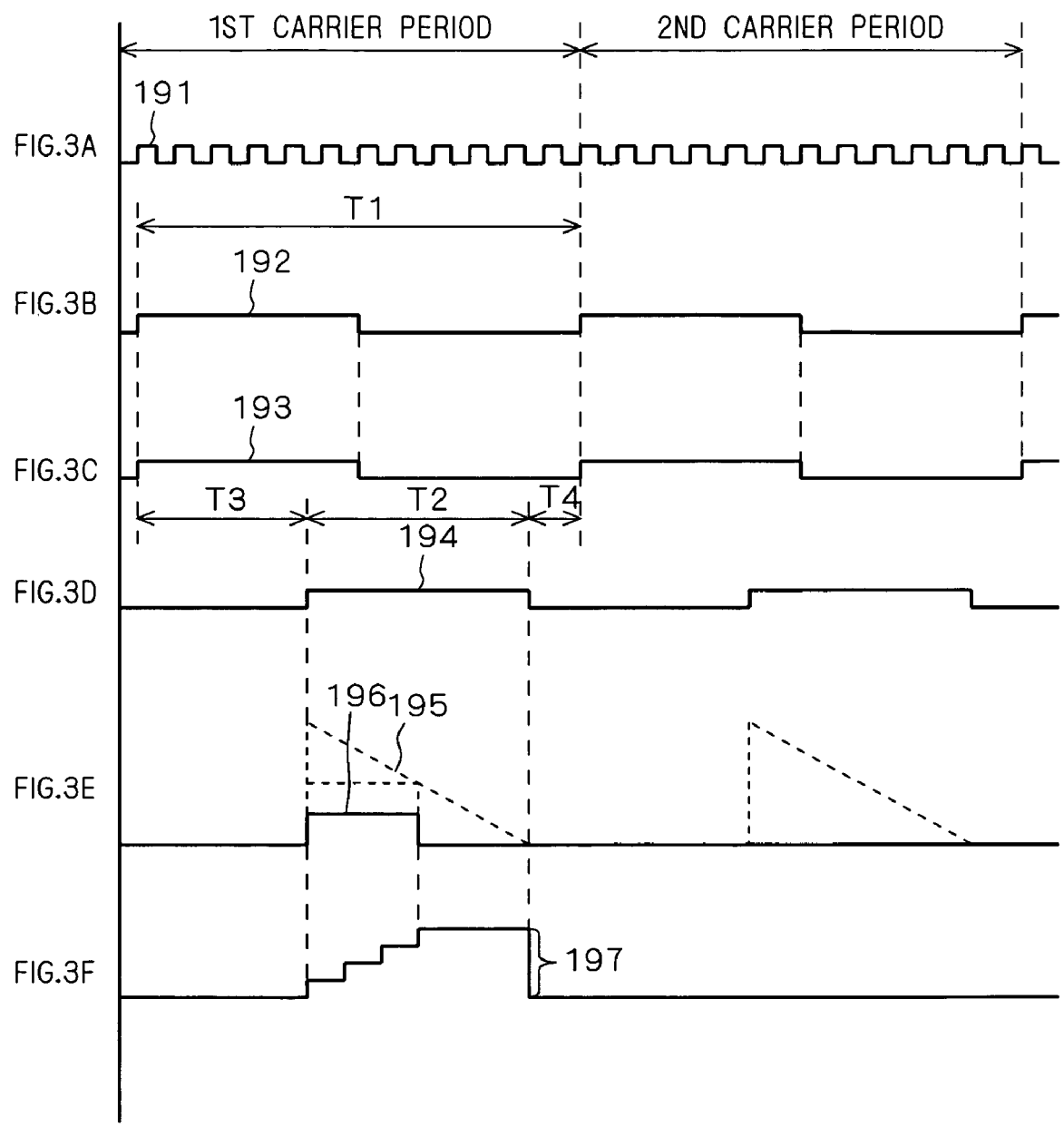
FIGS. 3A to 3F are timing charts showing the operation of the power semiconductor device according to a second preferred embodiment of the present invention.

A reference clock 191 as shown in FIG. 2A is inputted from the clock transmitter 170 to the CPU 160.

A carrier signal 192 for inverter control as shown in FIG. 2B is generated by the CPU 160 dividing down the frequency of the reference clock 191 inputted to the CPU 160. It is assumed that the carrier signal 192 has a period T1. In general, an inverter is controlled with T1=100 μs or T1=200 μs.

A first synchronization signal 193 as shown in FIG. 2C is inputted from the CPU 160 to the counter circuit 150. The first synchronization signal 193 has the period T1 and is in synchronism with the carrier signal 192. It is assumed that the delay time of the first synchronization signal 193 from the carrier signal 192 is zero.

A second synchronization signal 194 as shown in FIG. 2D is inputted from the counter circuit 150 to the HVICs 141 to 143 (although the second synchronization signal 194 is shown in FIG. 2D as inputted to the HVIC 141). The second synchronization signal 194 has the period T1 and is in synchronism with the first synchronization signal 193. It is assumed that the delay time of the second synchronization signal 194 from the first synchronization signal 193 is zero. The HVIC 141 reads the value of the voltage developed across the shunt resistor 131 on the rising edge of the second synchronization signal 194.

As shown in FIG. 2E, the HVIC 141 compares the read value of the voltage with an inverted sawtooth signal 195 to convert the value of the voltage developed across the shunt resistor 131 into the pulse width of a pulse 196. Then, the HVIC 141 outputs the pulse 196 to the counter circuit 150. Referring to FIG. 2E, the falling edge of the pulse 196 corresponds to an instant at which the read value of the voltage is equal to the inverted sawtooth signal 195. The inverted sawtooth signal 195 has a width T2=T1/2, and the width T2 corresponds to the maximum voltage value expressed by the width of the pulse 196 (or the maximum current value detected by the shunt resistor 131).

As shown in FIG. 2F, the counter circuit 150 counts pulses of a reference clock generated while the pulse 196 is high to measure the pulse width of the pulse 196, thereby generating numerical data 197. FIG. 2F is a conceptual illustration when the reference clock used herein is similar to the reference clock 191, wherein the height of each step corresponds to the width of the reference clock, and the sum of the heights of the steps corresponds to the numerical data 197. This reference clock is generated by the counter circuit 150 multiplying the first synchronization signal 193 inputted thereto. The counter circuit 150 outputs the numerical data 197 through an I/O bus to the CPU 160.

The CPU 160 reads the numerical data 197 on the rising edge of the carrier signal 192 in the next carrier period. The CPU 160 uses the numerical data 197 read thereto to control the gate drive circuit 180 through the I/O bus. The gate drive circuit 180 uses the inverter circuit 111 to 113 to control the three-phase motor 120.

In the power semiconductor device 100 according to the first preferred embodiment as described above, the counter circuit 150 outside the CPU 160 converts the pulse width of the pulse 196 into the numerical data 197. Therefore, the power semiconductor device 100 eliminates the need to use the input capture function of the CPU to produce the effect of placing no strain on channels for the input capture.

Additionally, the power semiconductor device 100 eliminates the need to use the interrupt function of the CPU, thereby avoiding the increase in load on the CPU 160. This produces the effects of preventing a real time property from being impaired and preventing the accuracy of measurement from decreasing.

Specifically, when the interrupt function of the CPU is used in the background art power semiconductor device, an interrupt occurs in timed relation to the input of a PWM signal from an HVIC to exert an influence in some cases upon other processes of the CPU. The power semiconductor device 100 according to the first preferred embodiment, however, exerts no influence upon other processes of the CPU because a time period during which the output from the counter circuit 150 is the numerical data 197 lasts for a while and the numerical data 197 may be read in predetermined timed relation.

Further, the HVICs 141 to 143 and the CPU 160 operate in synchronism with each other to reduce the delay and variations of the delay between the generation of the numerical data 197 based on the value of the voltage developed across the shunt resistor 131 and the reading of the numerical data 197 to the CPU 160. Therefore, the power semiconductor device 100 produces the effect of providing a faster response than the background art power semiconductor device in which the HVIC and the CPU operate asynchronously to each other.

[Second Preferred Embodiment]

In the power semiconductor device 100 according to the first preferred embodiment, the counter circuit 150 inputs to the HVIC 141 the second synchronization signal 194 the delay time of which is zero from the first synchronization signal 193, as shown in FIG. 2D. The counter circuit 150, however, may delay the input of the second synchronization signal 194 to the HVIC 141 by delay time T3 from the first synchronization signal 193. The delay time T3 is obtained by subtracting the width T2 of the inverted sawtooth signal 195 and processing time T4 in the counter circuit 150 from the period T1 of the carrier signal 192 (i.e., T3=T1−T2−T4). The processing time T4 is the time required for processing in the counter circuit 150 between the completion of the counting and the output of the numerical data 197.

FIGS. 3A to 3F are timing charts showing the operation of the power semiconductor device according to a second preferred embodiment of the present invention. FIGS. 3A to 3F differ from FIG. 2A to 2F in that the second synchronization signal 194 is delayed by the delay time T3 from the first synchronization signal 193. This causes the inverted sawtooth signal 195, the pulse 196 and the pulse corresponding to the numerical data 197 to be accordingly delayed by the delay time T3.

Referring to the timing charts of FIGS. 2A to 2F, the CPU 160 reads the numerical data 197 in a first carrier period on the rising edge of the carrier signal 192 in a second carrier period subsequent to the first carrier period. Thus, there arises a time difference T1−T2 between the instant at which the numerical data 197 is determined (i.e., the signal 195 reaches zero) and the instant at which the numerical data 197 is read. Referring to the timing charts of FIGS. 3A to 3F, on the other hand, the time difference between the instant at which the numerical data 197 is determined and the instant at which the numerical data 197 is read is made equal to the processing time T4. This minimizes the time difference to increase the accuracy of measurement. The delay time T3 is not limited to the above-mentioned delay time which satisfies T3=T1−T2−T4, but the delay time T3 which satisfies 0<T3<T1−T2−T4 can reduce the time difference, as compared with the first preferred embodiment.

As described above, the operation of the power semiconductor device according to the second preferred embodiment is such that the instant at which the value of the voltage developed across the shunt resistor 131 is read is delayed by the delay time T3 in the operation of the first preferred embodiment. Therefore, the second preferred embodiment reduces the time difference to increase the accuracy of measurement, as compared with the first preferred embodiment.

[Third Preferred Embodiment]

In general, the period T1 of the carrier signal 192 differs depending on the various constituents to be controlled, such as the three-phase motor 120 and the inverter circuits 111 to 113. Further, if problems (including noise, heat generation, quality variation of parts and the like) not assumed in the early stages of development have surfaced, it is necessary to change the delay time T3. This creates the need to develop power semiconductor devices for each type of automotive vehicles on which the power semiconductor devices are to be mounted, and a problem such that the development period for the power semiconductor devices might be prolonged.

Figure 4:
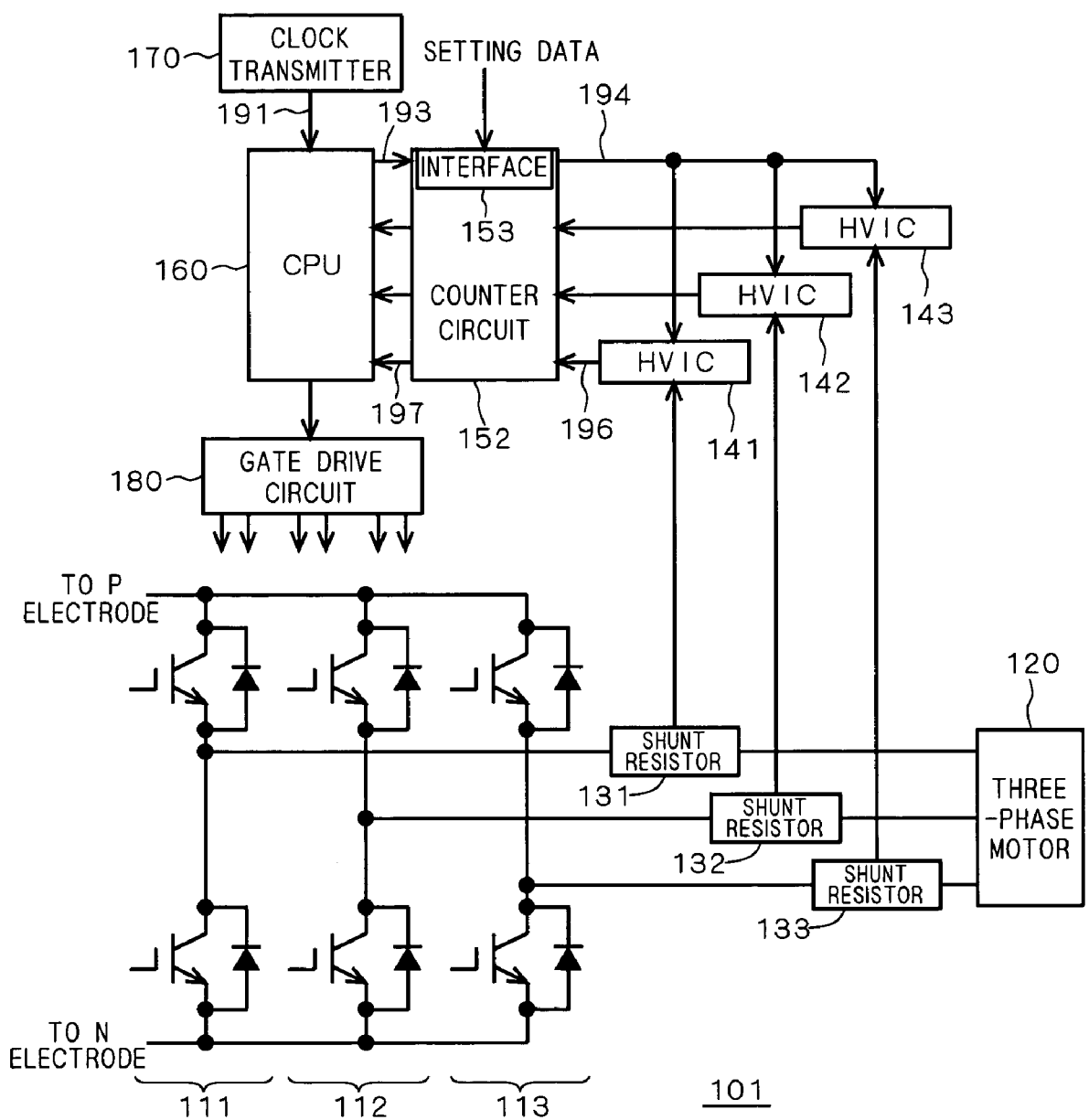
FIG. 4 is a diagram showing the construction of the power semiconductor device according to a third preferred embodiment of the present invention.

FIG. 4 shows the construction of a power semiconductor device 101 according to a third preferred embodiment of the present invention. The power semiconductor device 101 shown in FIG. 4 includes a counter circuit 152 constituted by CPLD (Complex Programmable Logic Devices) and the like and having an interface 153, in place of the counter circuit 150 of the power semiconductor device 100 shown in FIG. 1. Setting data including the delay time T3 in the counter circuit 152 is externally changeable through the interface 153.

In the power semiconductor device 101 according to the third preferred embodiment, as described above, the externally changeable setting data including the delay time T3 eliminates the need to develop power semiconductor devices for each type of automotive vehicles on which the power semiconductor devices are to be mounted, and the problem of the prolonged development period. This achieves the supply of a low-cost IPU (Intelligent Power Unit) within short delivery period.

Although described above as different circuits, the HVIC 141 to 143 and the counter circuit 152 may be integrated together as a single control IC (or a converting element). This achieves the supply of a compact and low-cost control IC. A system employing the shunt resistor and the HVIC is generally less costly than a system (Hall CT) employing a Hall element. Therefore, highly efficient vector control and the like can be effected at low costs.

While the invention has been described in detail, the foregoing description is in all aspects illustrative and not restrictive. It is understood that numerous other modifications and variations can be devised without departing from the scope of the invention.

What is claimed is:

1. A power semiconductor device comprising:
   a shunt resistor inserted in an output current path of an inverter circuit;
   a converting element comprising a high voltage IC for converting the value of the voltage developed across said shunt resistor into a pulse width, and a counter for converting said pulse width output from said high voltage IC into numerical data; and
   a CPU receiving said numerical data output from said converting element for controlling said inverter circuit based on said numerical data.

2. The power semiconductor device according to claim 1, wherein
   said CPU transmits a first synchronization signal to said counter, and
   said counter transmits a second synchronization signal to said high voltage IC, said second synchronization signal being based on said first synchronization signal.

3. The power semiconductor device according to claim 2, wherein
   said second synchronization signal is delayed by predetermined delay time from said first synchronization signal.

4. The power semiconductor device according to claim 3, wherein
   said predetermined delay time is determined to minimize a time difference between an instant at which said numerical data is outputted from said counter and an instant at which said CPU receives said numerical data.

5. The power semiconductor device according to claim 3, wherein
   a setting about said predetermined delay time in said counter is externally changeable.

6. The power semiconductor device according to claim 4, wherein
   a setting about said predetermined delay time in said counter is externally changeable.

* * * * *